United States Patent
Zheng et al.

(10) Patent No.: US 11,314,553 B2
(45) Date of Patent: Apr. 26, 2022

(54) METHOD, APPARATUS, AND COMPUTER PROGRAM PRODUCT FOR DETERMINING USAGE CHANGE RATE OF STORAGE SYSTEM

(71) Applicant: EMC IP Holding Company LLC, Hopkinton, MA (US)

(72) Inventors: Jim Zheng, Chengdu (CN); Guangjun He, Chengdu (CN); Qingxiao Zheng, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 176 days.

(21) Appl. No.: 16/668,821

(22) Filed: Oct. 30, 2019

(65) Prior Publication Data
US 2020/0379670 A1     Dec. 3, 2020

(30) Foreign Application Priority Data

May 27, 2019   (CN) .......................... 201910446999.5

(51) Int. Cl.
| | |
|---|---|
| *G06F 3/00* | (2006.01) |
| *G06F 9/50* | (2006.01) |
| *G06N 20/00* | (2019.01) |
| *G06F 3/06* | (2006.01) |
| *G06F 9/48* | (2006.01) |

(52) U.S. Cl.
CPC ............ *G06F 9/505* (2013.01); *G06F 3/0604* (2013.01); *G06F 3/0653* (2013.01); *G06F 3/0673* (2013.01); *G06F 9/4806* (2013.01); *G06N 20/00* (2019.01); *G06F 2209/5022* (2013.01)

(58) Field of Classification Search
None
See application file for complete search history.

(56) References Cited

U.S. PATENT DOCUMENTS

2021/0058306 A1*   2/2021   Szigeti ................ G06F 11/3006

* cited by examiner

*Primary Examiner* — Midys Rojas
(74) *Attorney, Agent, or Firm* — Womble Bond Dickinson (US) LLP (57) ABSTRACT

Embodiments of the present disclosure relate to a method, apparatus, and computer program product for determining a usage change rate of a storage system. The method comprises determining a first weighted moving average of a plurality of usage change rates of a storage system during a first time window, and determining a second weighted moving average of a plurality of usage change rates of the storage system during a second time window, wherein the first time window is a latter part of the second time window. The method further comprises obtaining a third weighted moving average based on the first weighted moving average and the second weighted moving average, and determining a usage change rate of the storage system based on the third weighted moving average. By performing several weighted moving average operations on a plurality of usage change rates of the storage system in the past time, embodiments of the present disclosure can decrease the lagging and increase the sensitivity of the usage change rate for a specified time window, thereby more accurately predicting the remaining service time of storage space of the storage system.

20 Claims, 4 Drawing Sheets

METHOD, APPARATUS, AND COMPUTER PROGRAM PRODUCT FOR DETERMINING USAGE CHANGE RATE OF STORAGE SYSTEM

CROSS-REFERENCE TO RELATED APPLICATION

This patent application claims priority, under 35 U.S.C. § 119, of Chinese Patent Application No. 201910576642.9, filed Jun. 28, 2019, entitled "METHOD, APPARATUS, AND COMPUTER PROGRAM PRODUCT FOR DETERMINING USAGE CHANGE RATE OF STORAGE SYSTEM."

FIELD

Embodiments of the present disclosure generally relate to the field of data storage, and more specifically, to a method, apparatus, and computer program product for determining a usage change rate of a storage system.

BACKGROUND

A storage system refers to a system comprising various storage devices storing programs and data, control parts, hardware devices managing information scheduling and different software, and usually can store a large amount of data. The storage system often adopts data backup technologies to ensure security of data storage. Redundant Array of Independent Disks is a data backup technology, which can combine a plurality of independent physical disks into a disk array (i.e., logical disk) in different ways, so as to provide better storage performance and higher reliability as compared to the single disk. Duplicate is also an approach for providing redundancy to data and services in the storage system.

Storage system usually is provided with a given storage capacity and it is required to add or replace new storage device(s) for data storage before the storage capacity runs out. Usually, the storage system can store data in a centralized or distributed manner. The distributed storage is a storage technology which stores the data dispersedly on multiple nodes. A distributed storage system often utilizes scalable architecture to share storage loads using the multiple nodes and can locate the storage information through positions, thereby effectively enhancing reliability and storage efficiency of the storage system.

SUMMARY

Embodiments of the present disclosure provide a method, apparatus, and computer program product for determining a usage change rate of a storage system. The present disclosure can enable the usage change rate to have less lagging and higher sensitivity for a specified time window, thereby more accurately predicting the remaining service time of storage space in the storage system.

In a first aspect of the present disclosure, there is provided a method for determining a usage change rate of a storage system. The method comprises determining a first weighted moving average of a plurality of usage change rates of the storage system during a first time window, and determining a second weighted moving average of a plurality of usage change rates of the storage system during a second time window, wherein the first time window is a latter part in the second time window. The method further comprises obtaining a third weighted moving average based on the first weighted moving average and the second weighted moving average, and determining the usage change rate of the storage system based on the third weighted moving average.

In a further aspect of the present disclosure, there is provided a device for determining a usage change rate of a storage system. The device comprises a processing unit and a memory, wherein the memory is coupled to the processing unit and storing instructions thereon. The instructions, when executed by the processing unit, perform acts comprising: determining a first weighted moving average of a plurality of usage change rates of the storage system during a first time window, determining a second weighted moving average of a plurality of usage change rates of the storage system during a second time window, wherein the first time window is a latter part in the second time window; obtaining a third weighted moving average based on the first weighted moving average and the second weighted moving average, and determining the usage change rate of the storage system based on the third weighted moving average.

In another aspect of the present disclosure, there is provided a computer program product tangibly stored on a non-transitory computer-readable medium and including machine-executable instructions. The computer-executable instructions, when executed, cause a computer to perform the methods or procedures in accordance with embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of respective embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same element in the example embodiments of the present disclosure.

DETAILED DESCRIPTION OF EMBODIMENTS

Preferred embodiments of the present disclosure will be described in more details below with reference to the drawings. Although the drawings illustrate some specific embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "a further embodiment" is to be read as "at least a further embodiment." The terms "first", "second" and so on can refer to same or different objects unless indicated otherwise. The term "weighted moving average" refers to assigning different weights to observation values respectively, calculating the moving average values according to different weights, and determining a prediction value based on the final moving average values.

A capacity prediction of a storage device is a key feature when users utilize the storage system, and users must buy new storage devices before the capacity gets used up so as to guarantee effective storage of new data. Traditionally, remaining service time of residual space of the storage system is usually predicted by simple averaging. For example, a traditional method calculates an average usage change rate in a specified time window using simple averaging.

TABLE 1

Example usage rates and usage change rates

| Time point | 1 | 2 | ... | T/2 | T/2 + 1 | T/2 + 2 | ... | T |
|---|---|---|---|---|---|---|---|---|
| Usage rate | $U_1$ | $U_2$ | ... | $U_{T/2}$ | $U_{T/2+1}$ | $U_{T/2+2}$ | ... | $U_T$ |
| Usage change rate | $C_1$ | $C_2$ | ... | $C_{T/2}$ | $C_{T/2+1}$ | $C_{T/2+2}$ | ... | $C_T$ |

Where the storage system records the usage rate as $U_t$ and the usage change rate as $C_t = U_t - U_{t-1}$ for time point t.

With reference to the above Table 1, the traditional simple averaging often calculates the usage change rate of time point T by simple averaging $C_1, C_2 \ldots C_T$. However, this simple averaging in fact calculates the average change rate of time point T/2 instead of average change rate of time point T. Accordingly, the usage change rate calculated by the traditional method has serious lagging and low sensitivity, which results into inaccurate predicated remaining service time of residual space of the storage system. Moreover, the traditional method for calculating the usage change rate fails to consider related parameters and properties of the storage system and thus has a low accuracy.

Regarding this, embodiments of the present disclosure provide a new solution of calculating a usage change rate of a storage system. By performing several weighted moving average operations on a plurality of usage change rates of the storage system in the past time, embodiments of the present disclosure can decrease the lagging and increase the sensitivity of the usage change rate for a specified time window, thereby more accurately predicting the remaining service time of residual space of the storage system. Moreover, embodiments of the present disclosure can more accurately calculate the weighted average usage change rate in the past time window, and then predicate, through the remaining space of the storage system, the time for which the storage system can sustain.

Basic principles and several example implementations of the present disclosure are explained below with reference to FIGS. 1 to 7. It should be understood that these example embodiments are provided merely to enable those skilled in the art to better understand and further implement embodiments of the present disclosure, rather than suggesting limitations on the scope of the present disclosure in any manners.

Figure 1:
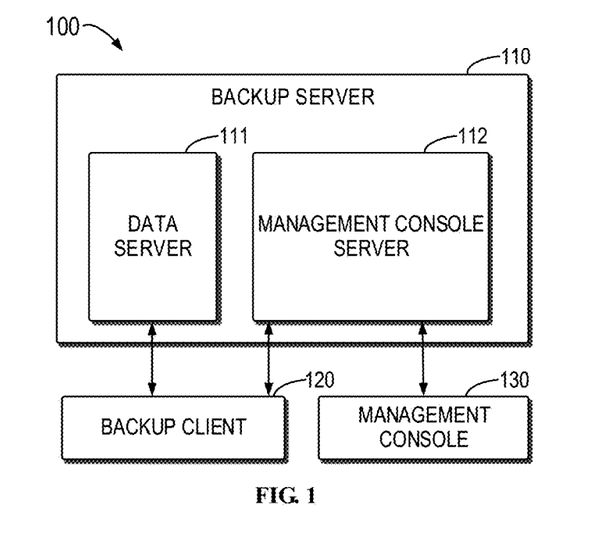
FIG. 1 illustrates a schematic diagram of an example architecture of a storage system in accordance with embodiments of the present disclosure.

In some embodiments, the storage system can have backup feature and accordingly become a backup system. FIG. 1 illustrates a schematic diagram of an exemplary architecture of a backup system 100 in accordance with embodiments of the present disclosure. As shown in FIG. 1, the backup system 100 includes a backup server 110, a backup client 120 and a management console 130, wherein the backup server 110 contains a data server 111 and a management console server 112.

The data server 111 is used for storing data, and the backup client 120, when executing backup, recovery or verification, will directly communicate with the data server 111, wherein all planned backup is initiated by a planning program of the management console server 112. The management console server 112 provides centralized management on the data server 110, e.g., planning, monitoring and management. The backup client 120 may be various computing devices, such as desktop computer, laptop, intelligent terminal and the like. Client software suitable for a variety of computing platforms can operate on the backup client 120, and each client software can include one client proxy and one or more plug-ins. The client proxy is a platform-specific software process and runs on the client software to communicate with the management console server 112 and any plug-ins mounted on the client. Plug-ins may include file system plug-ins and application plug-ins, wherein the file system plug-in is provided for browsing, backing up and recovering files or directories on a specific client file system, and the application plug-in supports backup and recovery of database or other special applications.

Figure 2:
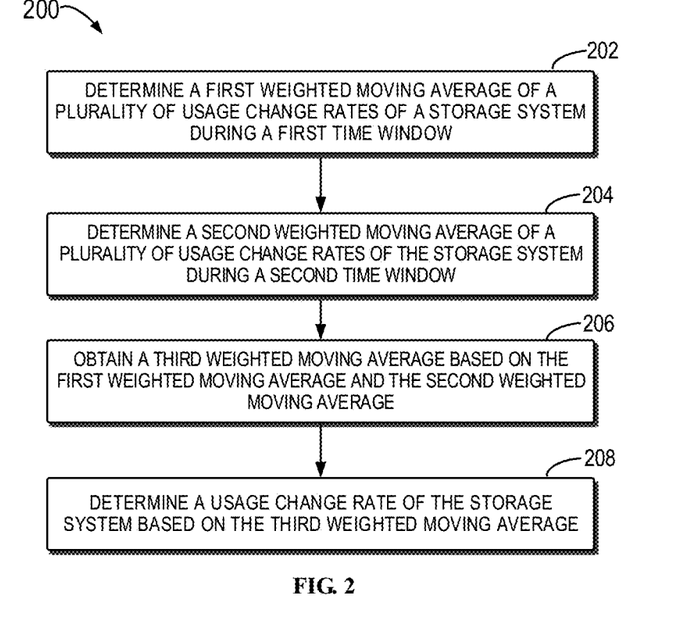
FIG. 2 illustrates a flowchart of a method for determining a usage change rate of the storage system in accordance with embodiments of the present disclosure.

FIG. 2 illustrates a flowchart of a method 200 for determining a usage change rate of the storage system in accordance with embodiments of the present disclosure.

At 202, a first weighted moving average of a plurality of usage change rates of the storage system during a first time window is determined. For example, assuming that the usage change rate in the time window [1, 2, 3 . . . T] is to be predicted, the first time window may be a latter half time window, i.e., [T/2, T/2+1, T/2+2, . . . , T]. It is understood that the first time window also can be selected as a latter one third of the full time window or a latter one fourth thereof etc. In the example where the first time window is the latter half, the first weighted moving average of the time window [T/2, T/2+1, T/2+2, T] is calculated to obtain a result MA1. For the convenience of description, it is assumed here that the time window value T can be exactly divided by 2. Those skilled in the art also can understand that similar effects also can be achieved by operations like rounding when the time window value is odd number. These appropriate variations and adjustments are well-known to those skilled in the art.

At 204, a second weighted moving average of a plurality of usage change rates of the storage system during a second time window is determined. For example, the second time window is time window [1, 2, 3, . . . T] and the second weighted moving average in the time window [1, 2, 3, . . . T] is calculated to obtain a result MA2.

At 206, a third weighted moving average is obtained from the first weighted moving average and the second weighted moving average. For example, the third weighted moving average may be set as MA3=(MA1−MA2)+MA1.

At 208, the usage change rate of the storage system is determined based on the third weighted moving average. For example, in some embodiments, MA3 is calculated for all time points to obtain a sequence of MA3 values. Then, the weighted moving average of the sequence of the MA3 values in time window [sqrt(T), sqrt(T)+1, . . . , T−2, T] is calculated to obtain a result of the usage change rate of time point T. If sqrt(T) is not an integer, it may be rounded up to an integer.

Therefore, an example of the method 200 for calculating the weighted average (CR-HMA) of the usage change rate of time point T may be represented by the following formula (1).

$$CR\text{-}HMA = WMA(\text{sqrt}(\text{TimeWindow } T), [2*WMA(\text{TimeWindow } T/2, \text{ChangeRate } C_{T/2}) - WMA(\text{TimeWindow } T, \text{ChangeRate } C_T)]) \quad (1)$$

Where TimeWindow denotes a time window and ChangeRate denotes a usage change rate and where WMA of time T may be represented by the following formula (2).

$$WMA = (C_T * T + C_{T-1} * (T-1) + C_{T-2} * (T-2) + \ldots + C_2 * 2 + C_1 * 1) / (T + (T-1) + (T-2) + \ldots + 2 + 1) \quad (2)$$

Therefore, the method 200 in accordance with embodiments of the present disclosure performs several weighted moving average operations on a plurality of usage change rates of the storage system in the past time, and can enable the usage change rate to have less lagging and higher sensitivity for a specified time window, so as to more accurately predict the remaining service time of residual space of the storage system.

In some embodiments, the capacity prediction of the storage device can depend on many factors, for example, the context of the prediction, the relevance and availability of historical data, the degree of accuracy desirable, the time period to be predicted, the cost/benefit (or value) of the prediction, and the time available for making the analysis and so on. In addition, the usage change rate may be affected by many factors, such as the backup client volumes, the backup task schedules, the backup data change rate, the de-duplication rate, the backup data expiration policies and the like.

Figure 3:
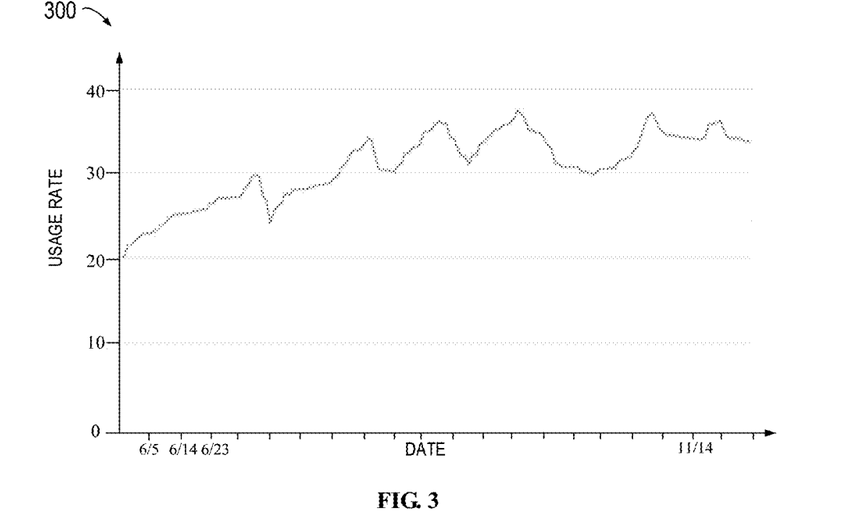
FIG. 3 illustrates a schematic diagram of a usage rate of the storage system within a period of time in accordance with embodiments of the present disclosure.

FIG. 3 illustrates a schematic diagram 300 of the usage rate of the storage system within a period of time in accordance with embodiments of the present disclosure, wherein horizontal axis indicates date and longitudinal axis represents usage rate. For example, everyday storage usage rate of the storage system in the past time may be collected. Alternatively, the storage usage rate may be recorded every predetermined time.

Figure 4:
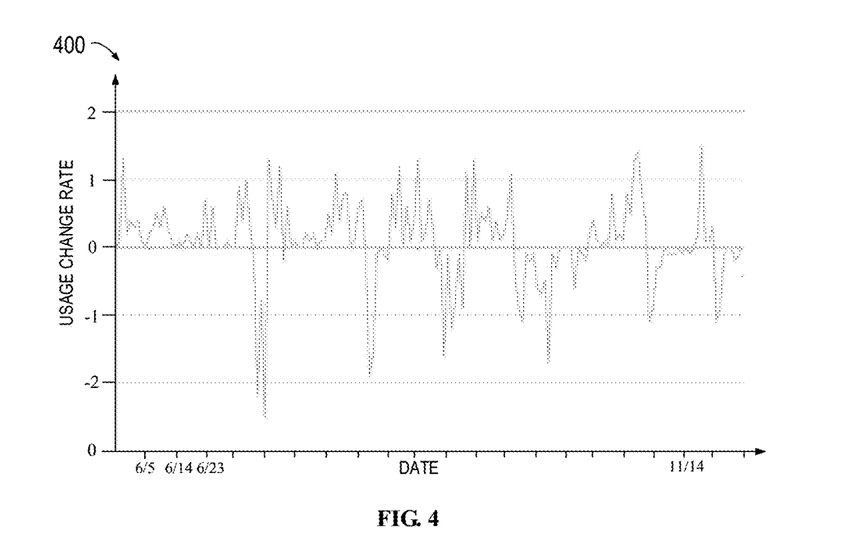
FIG. 4 illustrates a schematic diagram of a usage change rate of the storage system within a period of time in accordance with embodiments of the present disclosure.

FIG. 4 illustrates a schematic diagram 400 of the usage change rate of the storage system within a period of time in accordance with embodiments of the present disclosure, wherein horizontal axis indicates date and longitudinal axis represents usage change rate. For example, everyday storage usage rate of the storage system in the past time may be collected or the storage usage rate may be recorded every predetermined time. Then, the usage change rate is obtained based on the usage rate, i.e., a difference value between the usage rate recorded at the present time and that recorded at a previous time. As shown in FIG. 4, the everyday usage change rate varies dynamically, and if the usage rate is a negative value, it means that the available space is growing.

In some embodiments, the method may also comprises predicting the remaining service time of the storage capacity in the storage system based on the usage change rate of the storage system, and then displaying the predicted remaining service time to the user(s) of the storage system. For example, the predicted remaining service time may be displayed to the users in real time through the graphical user interface of the storage system, or the user is reminded, for example, by sending a message when the predicted remaining service time is quite short.

Figure 5:
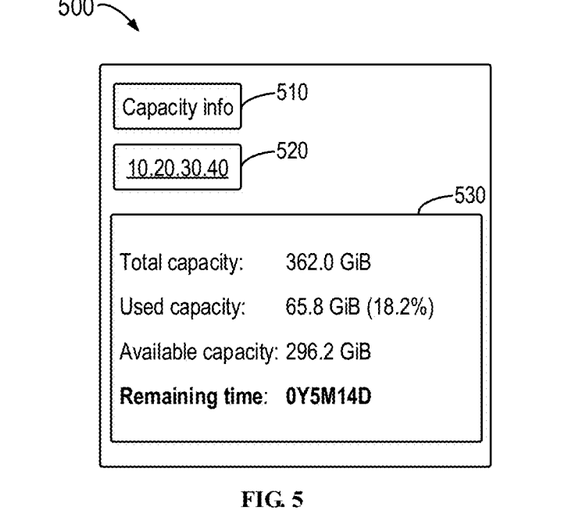
FIG. 5 illustrates a schematic diagram for presenting predicted remaining service time of the storage system in accordance with embodiments of the present disclosure.

FIG. 5 illustrates a schematic diagram 500 of presenting the predicted remaining service time of the storage system in accordance with embodiments of the present disclosure. FIG. 5 demonstrates a menu 510 of capacity information of a given storage system, a network IP address 520 and specific capacity information 530 including total capacity, used capacity, and available capacity of the storage system, as well as the remaining time predicted according to the embodiments of the present disclosure. Through the remaining time predicted according to the embodiments of the present disclosure, the user can accurately know the predicted time when the capacity of the storage system runs out, so as to be prepared in advance, such as purchasing new storage devices.

Figure 6:
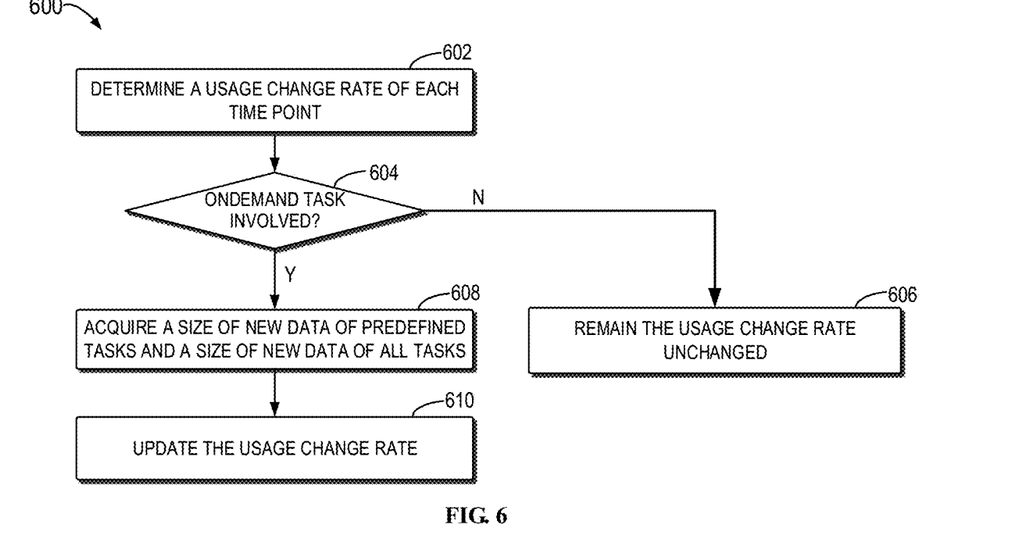
FIG. 6 illustrates a flowchart of a method for updating the usage change rate by removing low-frequency noises in accordance with embodiments of the present disclosure.

FIG. 6 illustrates a flowchart of a method 600 for updating the usage change rate by removing low-frequency noises in accordance with embodiments of the present disclosure. In a specific example, respective backup tasks and related information at time point t are demonstrated in Table 2 below.

TABLE 2

Task information at time point t

| Time | Backup task | Task type | Size of scanned original data (MB) | Size of New data (MB) | Validity period (day) |
|------|-------------|-----------|-----------------------------------|----------------------|----------------------|
| t | Task 1 | Predefined task | 100*1024 | 2*1024 | 30 |
| t | Task 2 | Predefined task | 100*1024 | 10 | 30 |
| t | Task 3 | Predefined task | 200*1024 | 200 | 60 |
| t | Task 4 | Predefined task | 200*1024 | 30 | 60 |
| t | Task 5 | OnDemand task | 500*1024 | 5*1024 | 30 |

Where time point may be every day, the predefined task is triggered by a scheduled table, and the OnDemand task is triggered by an administrator with an one-off operation and thus belongs to non-predefined task; the size of the scanned original data is the data size on the backup target machine, and the size of the new data is the data size on the storage system after de-duplication, and the validity period is the time for which the backup data is kept in the storage system.

In some embodiments, one or more predefined tasks and one or more OnDemand tasks in the backup system within a predetermined time may be obtained, and the time window is calculated based on the validity period of the one or more predefined tasks. For example, the time window may be an average value of the validity period of all predefined tasks in the past 30 days. In this way, a more appropriate time window can be obtained.

In some embodiments, the usage change rate may be updated by removing low-frequency noises. As shown in FIG. 6, the usage change rate at each time point is determined at 602. It is determined, at 604, whether each time point involves OnDemand tasks, wherein the OnDemand task is an one-off non-predefined task and belongs to noise data which should be removed. If the time point does not involve any OnDemand tasks, the usage change rate remains the same at 606, i.e., it is unnecessary to update the usage change rate. If the time involves OnDemand tasks, new data size of the predefined task of each time and new data of all tasks are acquired at 608, and the usage change rate is updated at 610. That is, noises of the one-off OnDemand task are removed.

The predefined task is helpful to predict the long-term trend of the usage change rate, but the OnDemand task will generate one-off noises. Accordingly, if there is an OnDemand task at time point t, embodiments of the present disclosure will eliminate its influence by re-calculating the usage change rate. For example, the usage change rate $c_t$ can be re-calculated via the following formula (3).

$$C_t = \text{Sum(new data size of all predefined tasks)/Sum (new data size of all tasks)} * C_t \quad (3)$$

Therefore, embodiments of the present disclosure enhance the usage change rate by removing low-frequency noises and further increases accuracy in predicting the remaining service time of the storage system. Embodiments of the present disclosure can more accurately predict the future usage condition of the storage space through past historical data. In other words, embodiments of the present disclosure can adjust the time window and the usage change rate for prediction based on backup task parameters and task type, so as to filter out the influences of the one-off OnDemand task. Hence, embodiments of the present disclosure can enable the usage change rate to have less lagging and higher sensitivity for a specified time window, so as to more accurately predict the remaining service time of residual space in the storage system, which helps acquiring a more accurate prediction result.

Figure 7:
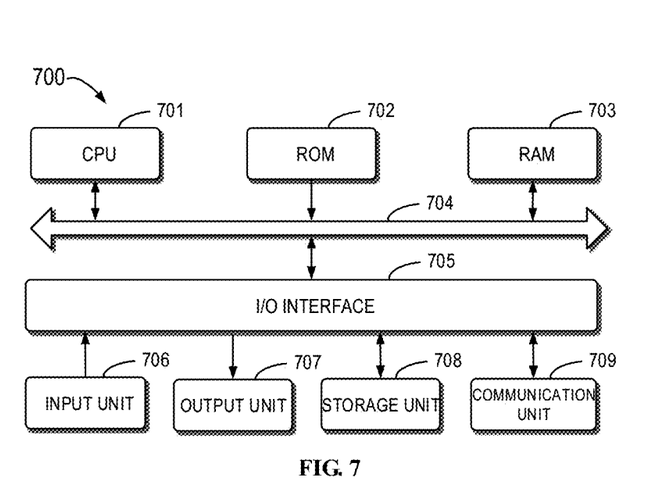
FIG. 7 illustrates a schematic block diagram of a device for implementing embodiments of the present disclosure.

FIG. 7 illustrates a schematic block diagram of a device 700 for implementing embodiments of the present disclosure. The device 700 can be a device or apparatus described in embodiments of the present disclosure. As shown, the device 700 includes a central processing unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each method or procedure can be executed by the processing unit 701. For example, in some embodiments, the method can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps or acts of the above described method or procedure can be implemented.

In some embodiments, the above described method and procedure may be implemented as computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages and traditional procedural programming languages, e.g., "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each embodiment and technical improvements made in the market by each embodiment, or enable other ordinary skilled in the art to understand respective embodiments of the present disclosure.

We claim:

1. A method for determining a usage change rate of a storage system, comprising:
   determining a first weighted moving average of a plurality of usage change rates of the storage system during a first time window;
   determining a second weighted moving average of a plurality of usage change rates of the storage system during a second time window, the first time window being a latter part of the second time window;
   obtaining a third weighted moving average based on the first weighted moving average and the second weighted moving average; and
   determining, based on the third weighted moving average, a usage change rate of the storage system.

2. The method of claim 1, wherein the determining a usage change rate of the storage system comprises:
   obtaining a sequence of values based on a corresponding third weighted moving average at each time point of the usage change rates; and
   determining a fourth weighted moving average of the sequence of values during a third time window, the third time window being a subset of the second time window.

3. The method of claim 2, wherein end points of the first time window, the second time window and the third time window are the same given time point, and the determining a usage change rate of the storage system further comprises:
   determining the fourth weighted moving average as a weighted average usage change rate at the given time point.

4. The method of claim 1, wherein the storage system is a backup system, and the method further comprises:
   obtaining one or more predefined tasks and one or more non-predefined tasks in the backup system within a predetermined time; and
   determining, based on a validity period of the one or more predefined tasks, the second time window.

5. The method of claim 1, further comprising:
   determining, based on a first usage rate at a first time point and a second usage rate at a second time point, a first usage change rate at the first time point, the second time point being a time point earlier than the first time point; and
   updating the first usage change rate by removing low-frequency noises.

6. The method of claim 5, wherein the updating the first usage change rate comprises:
   in response to data backup of the first time point involving predefined tasks and non-predefined tasks simultaneously, updating the first usage change rate based on a size of new data of the predefined tasks.

7. The method of claim 6, wherein the updating the first usage change rate further comprises:
   updating the first usage change rate based on a ratio between a size of new data of the predefined tasks and a size of new data of all tasks at the first time.

8. The method of claim 1, further comprising:
   predicting, based on the usage change rate of the storage system, remaining service time of storage capacity in the storage system; and
   displaying, to a user of the storage system, the predicted remaining service time.

9. A device for determining a usage change rate of a storage system, comprising:

a processing unit; and a memory coupled to the processing unit and storing instructions thereon, the instructions, when executed by the processing unit, perform operations comprising:

determining a first weighted moving average of a plurality of usage change rates of the storage system during a first time window;

determining a second weighted moving average of a plurality of usage change rates of the storage system during a second time window, the first time window being a latter part of the second time window;

obtaining a third weighted moving average based on the first weighted moving average and the second weighted moving average; and determining, based on the third weighted moving average, a usage change rate of the storage system.

10. The device of claim 9, wherein the determining a usage change rate of the storage system comprises:

obtaining a sequence of values based on a corresponding third weighted moving average at each time point of the usage change rates; and determining a fourth weighted moving average of the sequence of values during a third time window, the third time window being a subset of the second time window.

11. The device of claim 10, wherein end points of the first time window, the second time window and the third time window are the same given time point, and the determining a usage change rate of the storage system further comprises:

determining the fourth weighted moving average as a weighted average usage change rate at the given time point.

12. The device of claim 9, wherein the storage system is a backup system, and the operations further comprise:

obtaining one or more predefined tasks and one or more non-predefined tasks in the backup system within a predetermined time; and determining, based on a validity period of the one or more predefined tasks, the second time window.

13. The device of claim 9, wherein the operations further comprise:

determining, based on a first usage rate at a first time point and a second usage rate at a second time point, a first usage change rate at the first time point, the second time point being a time point earlier than the first time point; and updating the first usage change rate by removing low-frequency noises.

14. The device of claim 13, wherein the updating the first usage change rate comprises:

in response to data backup of the first time point involving predefined tasks and non-predefined tasks simultaneously, updating the first usage change rate based on a size of new data of the predefined tasks.

15. The device of claim 14, wherein the updating the first usage change rate further comprises:

updating the first usage change rate based on a ratio between a size of new data of the predefined tasks and a size of new data of all tasks at the first time.

16. The device of claim 9, wherein the operations further comprise:

predicting, based on the usage change rate of the storage system, remaining service time of storage capacity in the storage system; and displaying, to a user of the storage system, the predicted remaining service time.

17. A computer program product tangibly stored on a non-transitory computer-readable medium and comprising machine-executable instructions, the machine-executable instructions, when executed, causing a computer to perform operations for determining a usage change rate of a storage system, the operations comprising:

determining a first weighted moving average of a plurality of usage change rates of the storage system during a first time window;

determining a second weighted moving average of a plurality of usage change rates of the storage system during a second time window, the first time window being a latter part of the second time window;

obtaining a third weighted moving average based on the first weighted moving average and the second weighted moving average; and determining, based on the third weighted moving average, a usage change rate of the storage system.

18. The computer program product of claim 17, wherein the determining a usage change rate of the storage system comprises:

obtaining a sequence of values based on a corresponding third weighted moving average at each time point of the usage change rates; and determining a fourth weighted moving average of the sequence of values during a third time window, the third time window being a subset of the second time window.

19. The computer program product of claim 18, wherein end points of the first time window, the second time window and the third time window are the same given time point, and the determining a usage change rate of the storage system further comprises:

determining the fourth weighted moving average as a weighted average usage change rate at the given time point.

20. The computer program product of claim 17, wherein the storage system is a backup system, and the operations further comprise:

obtaining one or more predefined tasks and one or more non-predefined tasks in the backup system within a predetermined time; and determining, based on a validity period of the one or more predefined tasks, the second time window.

* * * * *